United States Patent
Al-Imari et al.

(10) Patent No.: US 11,246,153 B2
(45) Date of Patent: Feb. 8, 2022

(54) METHOD AND APPARATUS FOR HANDLING OUT-OF-ORDER UPLINK SCHEDULING IN MOBILE COMMUNICATIONS

(71) Applicant: MediaTek Singapore Pte. Ltd., Singapore (SG)

(72) Inventors: Mohammed S Aleabe Al-Imari, Cambridge (GB); Abdellatif Salah, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 87 days.

(21) Appl. No.: 16/789,799

(22) Filed: Feb. 13, 2020

(65) Prior Publication Data

US 2020/0267749 A1     Aug. 20, 2020

Related U.S. Application Data

(60) Provisional application No. 62/806,011, filed on Feb. 15, 2019, provisional application No. 62/936,657, filed on Nov. 18, 2019.

(51) Int. Cl.
| | |
|---|---|
| *H04W 72/04* | (2009.01) |
| *H04W 72/12* | (2009.01) |
| *H04L 5/00* | (2006.01) |
| *H04W 16/14* | (2009.01) |

(52) U.S. Cl.
CPC ....... *H04W 72/1289* (2013.01); *H04L 5/0053* (2013.01); *H04W 16/14* (2013.01); *H04W 72/042* (2013.01); *H04W 72/1215* (2013.01)

(58) Field of Classification Search
CPC ......... H04W 72/1289; H04W 72/1215; H04W 72/042; H04W 16/14; H04W 72/1268; H04L 5/0053; H04L 5/0007; H04L 5/0044

See application file for complete search history.

(56) References Cited

U.S. PATENT DOCUMENTS

| | | | |
|---|---|---|---|
| 2017/0289869 A1* | 10/2017 | Nogami | H04W 36/0072 |
| 2018/0167931 A1* | 6/2018 | Papasakellariou | H04L 1/1887 |
| 2018/0206229 A1* | 7/2018 | Zeng | H04W 72/048 |

(Continued)

FOREIGN PATENT DOCUMENTS

CN     107396394 A     11/2017

OTHER PUBLICATIONS

China National Intellectual Property Administration, International Search Report and Written Opinion for PCT/CN2020/075267, dated May 8, 2020.

*Primary Examiner* — Lan-Huong Truong
(74) *Attorney, Agent, or Firm* — Han IP PLLC; Andy M. Han (57) ABSTRACT

Various solutions for handling out-of-order uplink scheduling with respect to user equipment and network apparatus in mobile communications are described. An apparatus may receive a first control signal scheduling a first uplink transmission. The apparatus may receive a second control signal scheduling a second uplink transmission. The apparatus may determine whether the second uplink transmission is scheduled earlier than the first uplink transmission. The apparatus may drop the first uplink transmission in an event that the second uplink transmission is scheduled earlier than the first uplink transmission.

14 Claims, 8 Drawing Sheets

(56) References Cited

U.S. PATENT DOCUMENTS

2018/0324825 A1\* 11/2018 Jiang ................. H04W 72/1289
2018/0332539 A1 11/2018 Fan et al.
2018/0332577 A1\* 11/2018 Yang .................... H04L 5/0055
2018/0368117 A1 12/2018 Ying et al.

\* cited by examiner

METHOD AND APPARATUS FOR HANDLING OUT-OF-ORDER UPLINK SCHEDULING IN MOBILE COMMUNICATIONS

CROSS REFERENCE TO RELATED PATENT APPLICATION(S)

The present disclosure claims the priority benefit of U.S. Provisional Patent Application No. 62/806,011, filed 15 Feb. 2019, and U.S. Provisional Patent Application No. 62/936,657, filed 18 Nov. 2019. The contents of aforementioned applications are herein incorporated by reference in their entirety.

TECHNICAL FIELD

The present disclosure is generally related to mobile communications and, more particularly, to handling out-of-order uplink scheduling with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR) Release15, there is a restriction on the order between the scheduled physical uplink shared channels (PUSCHs) and their scheduling physical downlink control channels (PDCCHs). Thus, out-of-order uplink scheduling is not supported. Therefore, the user equipment (UE) will not be scheduled with out-of-order uplink scheduling. The network node is not allowed to schedule out-of-order uplink transmissions to the UE.

In some applications, supporting out-of-order uplink scheduling is beneficial to operate UE with mixed traffics (e.g. ultra-reliable low-latency communication (URLLC) and enhanced mobile broadband (eMBB)) with different requirements. For example, URLLC services usually have stringent latency requirements than eMBB services. With out-of-order uplink scheduling, the UE may be able to process the transmissions for URLLC services first to meet the latency requirements. However, out-of-order uplink scheduling could cause issues with UE processing timeline. When the out-of-order uplink transmissions are scheduled to the UE, the UE may not have enough processing time to prepare all the uplink transmissions.

In an event that the out-of-order uplink transmissions are scheduled closely, massive computation and huge burden will be raised on the UE which leads to increased power consumption and complicated UE implementation. Forcing to apply more aggressive UE processing time requirements will lead to severe challenges on UE implementation and cost. Hence, proper solutions are needed to handle out-of-order uplink scheduling while still not putting a lot of pressure on the UE implementation and architecture.

Accordingly, how to handle out-of-order uplink scheduling and avoid increasing complexity on the UE implementation and architecture becomes an important aspect for the newly developed wireless communication network. Therefore, it is needed to provide proper schemes for the UE to support out-of-order uplink scheduling and keep some flexibility on design complexity.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to handling out-of-order uplink scheduling with respect to user equipment and network apparatus in mobile communications.

In one aspect, a method may involve an apparatus receiving a first control signal scheduling a first uplink transmission. The method may also involve the apparatus receiving a second control signal scheduling a second uplink transmission. The method may further involve the apparatus determine whether the second uplink transmission is scheduled earlier than the first uplink transmission. The method may further involve the apparatus dropping the first uplink transmission in an event that the second uplink transmission is scheduled earlier than the first uplink transmission.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a first control signal scheduling a first uplink transmission. The processor may also perform operations comprising receiving, via the transceiver, a second control signal scheduling a second uplink transmission. The processor may further perform operations comprising determine whether the second uplink transmission is scheduled earlier than the first uplink transmission. The processor may further perform operations comprising dropping the first uplink transmission in an event that the second uplink transmission is scheduled earlier than the first uplink transmission.

It is noteworthy that, although description provided herein may be in the context of certain radio access technologies, networks and network topologies such as Long-Term Evolution (LTE), LTE-Advanced, LTE-Advanced Pro, 5$^{th}$ Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to handling out-of-order uplink scheduling with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR Release15, there is a restriction on the order between the scheduled PUSCHs and their scheduling PDCCHs. Thus, out-of-order uplink scheduling is not supported. For example, such restriction is described in the 3$^{rd}$ Generation Partnership Project (3GPP) specifications as "For any two hybrid automatic repeat request-acknowledgement (HARQ) process identifiers (IDs) in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i". Therefore, the UE will not be scheduled with out-of-order uplink scheduling. The network node is not allowed to schedule out-of-order uplink transmissions to the UE.

In some applications, supporting out-of-order uplink scheduling is beneficial to operate UE with mixed traffics (e.g. URLLC and eMBB) with different requirements. For example, URLLC services usually have stringent latency requirements than eMBB services. With out-of-order uplink scheduling, the UE may be able to process the transmissions for URLLC services first to meet the latency requirements. However, out-of-order uplink scheduling could cause issues with UE processing timeline (e.g., preparing uplink data). When the out-of-order uplink transmissions are scheduled to the UE, the UE may not have enough processing time to prepare all the uplink transmissions. For example, when a first downlink control information (DCI) is received, the UE will decode it and prepare for the transmission of the associated PUSCH. When a second DCI scheduling another PUSCH before the initially scheduled PUSCH is transmitted, it means that the UE will have an extra burden to prepare the second PUSCH while being prepared for the earlier PUSCH.

In an event that the out-of-order uplink transmissions are scheduled closely, massive computation and huge burden will be raised on the UE which leads to increased power consumption and complicated UE implementation. Forcing to apply more aggressive UE processing time requirements will lead to severe challenges on UE implementation and cost. Hence, in order to support out-of-order uplink scheduling without increasing UE implementation complexity and cost, the UE may require some scheduling/dropping conditions/rules to handle the out-of-order uplink scheduling. Accordingly, proper solutions are needed to handle out-of-order uplink scheduling while still not putting a lot of pressure on the UE implementation and architecture.

In view of the above, the present disclosure proposes a number of schemes pertaining to handling out-of-order uplink scheduling with respect to the UE and the network apparatus. According to the schemes of the present disclosure, the UE may be configured to determine whether the out-of-order uplink transmissions are scheduled. The UE may be configured to drop at least one uplink transmission according to some scheduling/dropping conditions in an event that the out-of-order uplink transmissions are scheduled. On the other hand, the UE may be configured to extend the preparation time for the later uplink transmission in an event that the out-of-order uplink transmissions are scheduled. Accordingly, the UE may have flexibility to support out-of-order uplink scheduling without a lot of pressure on the UE implementation and architecture.

Figure 1:
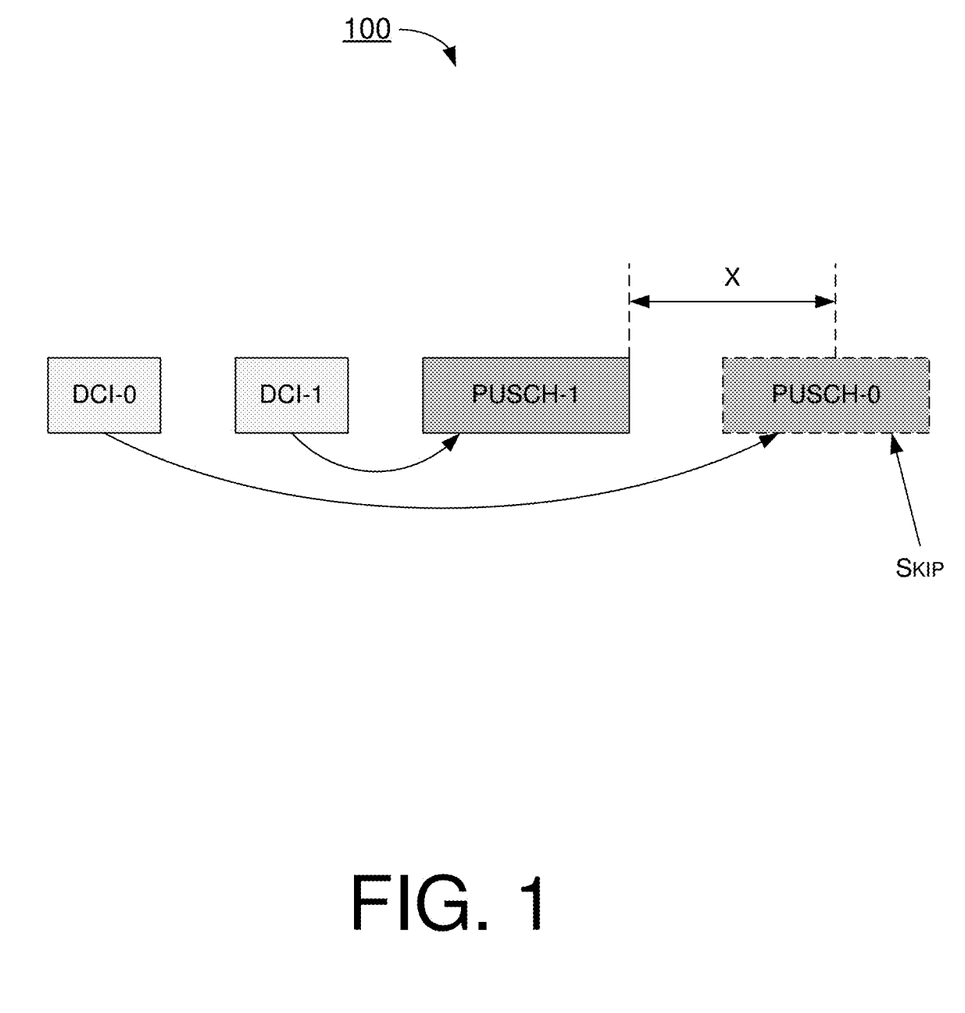
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 100 shows an example of the out-of-order uplink scheduling. The UE may be configured to receive a first control signal from the network node. The first control signal may comprise a first DCI or PDCCH (e.g., DCI-0) scheduling a first uplink transmission. The first uplink transmission may comprise a PUSCH (e.g., PUSCH-0). The UE may be configured to receive a second control signal from the network node. The second control signal is received later than the first control signal. The second control signal may comprise a second DCI or PDCCH (e.g., DCI-1) scheduling a second uplink transmission. The second uplink transmission may comprise a PUSCH (e.g., PUSCH-1). For the out-of-order uplink scheduling, on an active bandwidth part (BWP) of a given serving cell, the UE may be scheduled with a second PUSCH (e.g., PUSCH-1) associated with HARQ process x starting earlier than the ending symbol of the first PUSCH (e.g., PUSCH-0) associated with HARQ process y (e.g., x !=y) with a PDCCH (e.g., DCI-1) that does not end earlier than the ending symbol of first scheduling PDCCH (e.g., DCI-0).

The UE may be configured to determine whether the out-of-order uplink scheduling is scheduled (e.g., whether the second uplink transmission is scheduled earlier than the first uplink transmission). The UE may be configured to skip (e.g., not to transmit) at least one uplink transmission (e.g., PUSCH) in an event that the out-of-order uplink scheduling is scheduled. For example, the UE may drop the first uplink transmission in an event that the second uplink transmission is scheduled earlier than the first uplink transmission. Specifically, the UE may be configured to skip transmitting the PUSCH (e.g., PUSCH-0), with the scheduling PDCCH (e.g., DCI-0) before the PDCCH (e.g., DCI-1) that scheduled the later PUSCH (e.g., PUSCH-1), with the first symbol within a predetermined symbols (e.g., X symbols) after the end/last symbol of the later PUSCH (e.g., PUSCH-1) that is scheduled to follow out-of-order uplink scheduling.

In some implementations, the value of the predetermined symbols (e.g., X symbols) may comprise the PUSCH preparation time based on one of the UE capabilities (e.g. capability #1 or capability #2). Alternatively, the support of the predetermined symbols may be defined as a UE capability. The UE may be configured to report a value of the predetermined symbols as a UE capability. One possible option is to specify multiple values of X, and the UE may report the value of X it can support.

Figure 2:
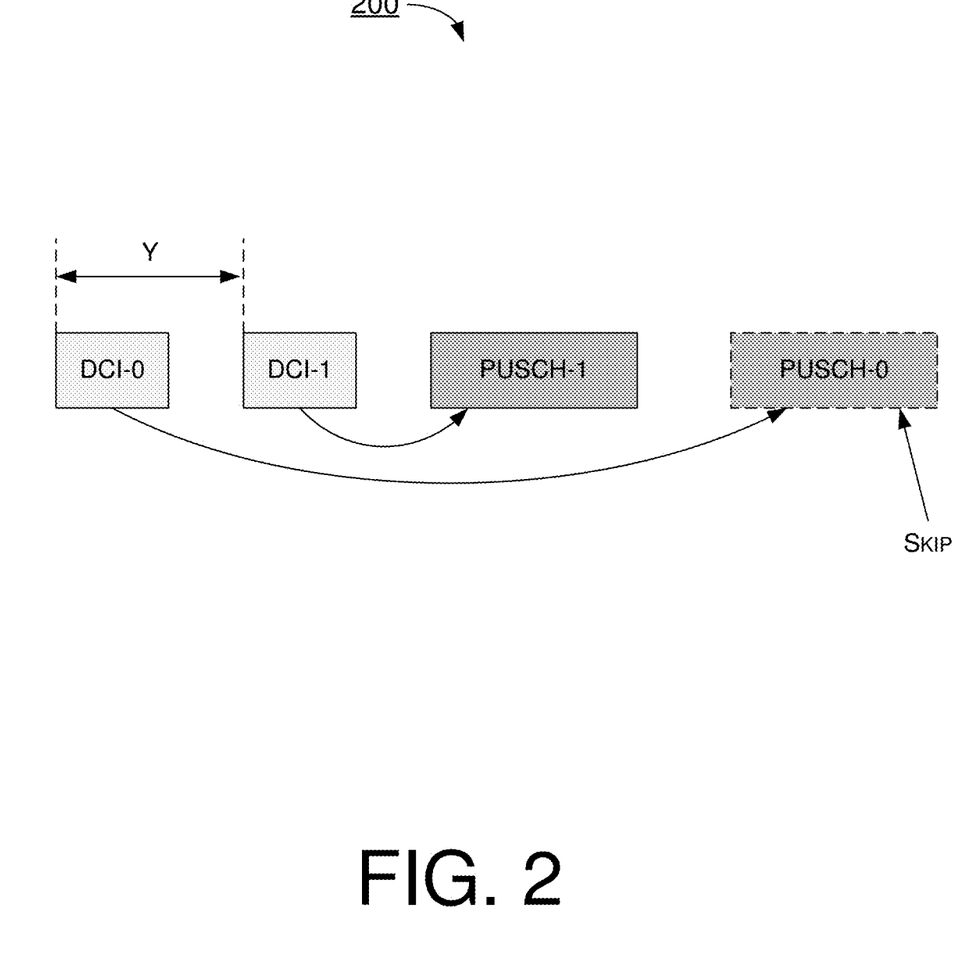
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 200 shows another example of skipping the uplink transmission in view of the out-of-order uplink scheduling. Similarly, the UE may be scheduled with a second PUSCH (e.g., PUSCH-1) starting earlier than the first PUSCH (e.g., PUSCH-0) with a PDCCH (e.g., DCI-1) that does not end earlier than the first scheduling PDCCH (e.g., DCI-0).

The UE may be configured to determine whether the out-of-order uplink scheduling is scheduled by determining whether a last symbol of the first control signal is within a predetermined symbol before a first symbol of the second control signal. The UE may be configured to skip at least one uplink transmission (e.g., PUSCH) in an event that the out-of-order uplink scheduling is scheduled. Specifically, the UE may be configured to skip transmitting the PUSCH (e.g., PUSCH-0), with the scheduling PDCCH (e.g., DCI-0) before the PDCCH (e.g., DCI-1) that scheduled the later PUSCH (e.g., PUSCH-1), in an event that the last symbol of the scheduling PDCCH (e.g., DCI-0) is within a predetermined symbols (e.g., Y symbols) before the start/first symbol of the PDCCH (e.g., DCI-1) scheduling the later PUSCH (e.g., PUSCH-1).

In some implementations, the value of the predetermined symbols (e.g., Y symbols) may comprise the PUSCH preparation time based on one of the UE capabilities (e.g. capability #1 or capability #2). Alternatively, the support of the predetermined symbols may be defined as a UE capability. The UE may be configured to report a value of the predetermined symbols as a UE capability. One possible option is to specify multiple values of Y, and the UE may report the value of Y it can support.

On the other hand, after determining that the out-of-order uplink scheduling is scheduled (e.g., the second uplink transmission is scheduled earlier than the first uplink transmission), the UE may be configured to extend a preparation time of the second uplink transmission (e.g., later scheduled PUSCH) by a predetermined number of symbols (e.g., E symbols). For example, N2 may be defined as the PUSCH preparation time for the later PUSCH when there is no out-of-order UL scheduling. For the out-of-order uplink scheduling case, the PUSCH preparation time for the later scheduled PUSCH may be extended as N2+E symbols. The support of predetermined number of symbols (e.g., E symbols) may be defined as a UE capability. The UE may be configured to report a value of the predetermined symbols as a UE capability. One possible option is to specify multiple values of E, and the UE may report the value of E it needs to accommodate the out-of-order uplink scheduling.

In some implementations, for the case when the UE may skip at least one uplink transmission (e.g., PUSCH) due to the out-of-order uplink scheduling, the PUSCH preparation time for the later scheduled PUSCH may be extended by E symbols. The UE may be configured to determine whether it can skip at least one PUSCH due to the out-of-order uplink scheduling. The UE may be configured to extend the preparation time of the later scheduled PUSCH by E symbols in an event that the UE determines that it can skip at least one PUSCH due to the out-of-order uplink scheduling. For example, N2 may be defined as the PUSCH preparation time for the later scheduled PUSCH when there is no skipping scenario. For the skipping case, the PUSCH preparation time for the later scheduled PUSCH may be extended as N2+E symbols.

Figure 3:
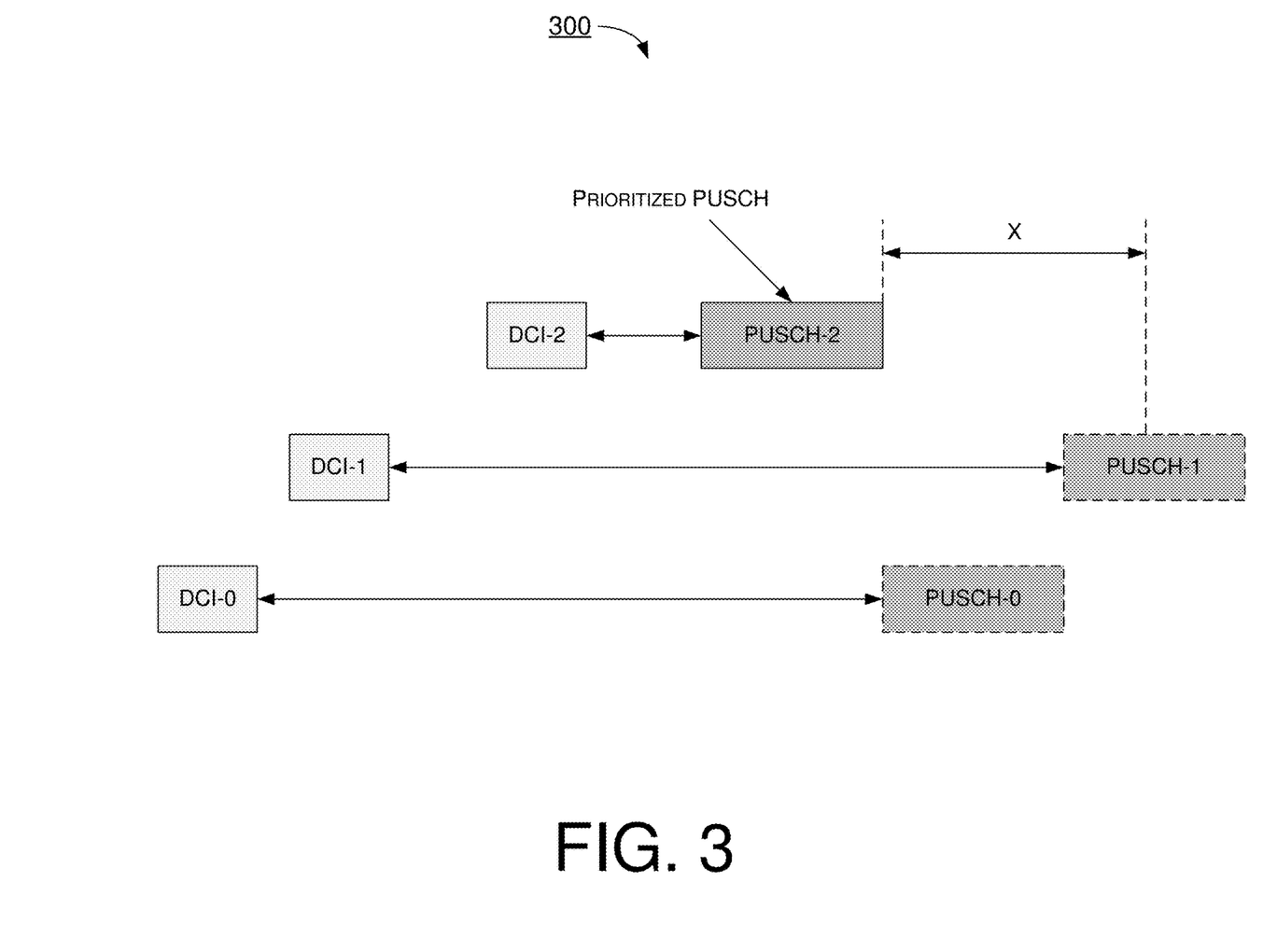
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 300 shows another example of the out-of-order uplink scheduling. For the out-of-order uplink scheduling, the UE may be configured to drop the transmission of the uplink transmissions (e.g., PUSCHs) that their starting symbol (e.g., first symbol) is within a predetermined symbols (e.g., X symbols) after the end (e.g., last symbol) of the prioritized uplink transmission. In scenario 300, PUSCH-2 may be the prioritized PUSCH. The UE may drop PUSCH-0 and PUSCH-1 since their starting symbol is within X symbols after the end of PUSCH-2.

In some embodiments, for any two HARQ process IDs in a given scheduled cell, in an event that the UE is scheduled to start a first PUSCH transmission starting in symbol j by a PDCCH ending in symbol i, and in an event that the UE is scheduled to transmit a second PUSCH (e.g., PUSCH-2) starting earlier than the end of the first PUSCH by a PDCCH (e.g., DCI-2) that ends later than symbol i, the UE may be configured to skip any PUSCH transmission (e.g., PUSCH-0 or PUSCH-1) that starts within X symbols after the end of the second PUSCH (e.g., PUSCH-2).

In some implementations, the value of the predetermined symbols (e.g., X symbols) may comprise the PUSCH preparation time (e.g., N2). The PUSCH preparation time may be configured by the network node or predetermined by the UE. Alternatively, the value of the predetermined symbols (e.g., X symbols) may comprise a predetermined value (e.g., $T_{proc,2}$) defined in the 3GPP specifications. Alternatively, the value of the predetermined symbols may be defined as a UE capability. The UE may be configured to report a value of the predetermined symbols as a UE capability. One possible option is to specify multiple values of X, and the UE may report the value of X it can support.

Figure 4:
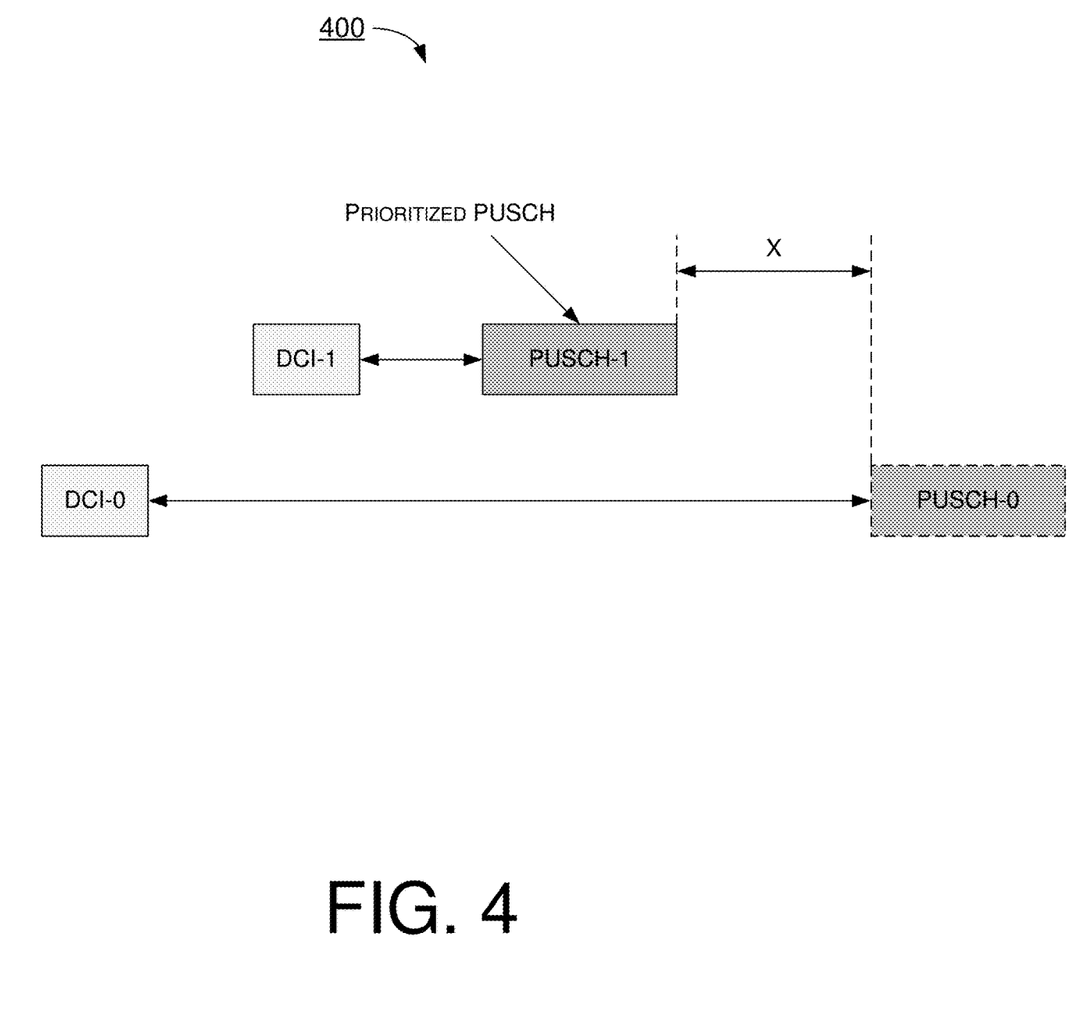
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 400 shows another example of the out-of-order uplink scheduling. The UE may receive a first control signal (e.g., DCI-0) scheduling a first uplink transmission (e.g., PUSCH-0) and a second control signal (e.g., DCI-1) scheduling a second uplink transmission (e.g., PUSCH-1). For out-of-order uplink scheduling, there should be a gap of X symbols between the prioritized uplink transmission (e.g., PUSCH-1) and the start of any previously scheduled uplink transmission (e.g., PUSCH-0). For any two HARQ process IDs in a given scheduled cell, in an event that the UE is scheduled to start a first PUSCH transmission (e.g., PUSCH-0) starting in symbol j by a PDCCH (e.g., DCI-0) ending in symbol i, the UE is not expected to be scheduled to transmit a PUSCH ending within X symbols earlier than the start of the first PUSCH by a PDCCH that ends later than symbol i.

In some embodiments, in an event that the gap between the prioritized PUSCH (e.g., PUSCH-1) and the start of any previously scheduled PUSCH (e.g., PUSCH-0) is smaller than X, the UE may consider this as an error case. The UE is not expected to be scheduled with out-of-order uplink scheduling where the gap between the prioritized PUSCH and the start of any previously scheduled PUSCH is smaller than X. The UE may be configured to ignore/discard at least one of the first control signal (e.g., DCI-0) and the second control signal (e.g., DCI-1) and not to transmit at least one of the first uplink transmission (e.g., PUSCH-0) and the second uplink transmission (e.g., PUSCH-1).

In some implementations, the gap of X symbols may comprise the PUSCH preparation time (e.g., N2). The PUSCH preparation time may be configured by the network node or predetermined by the UE. Alternatively, the value of the gap of X symbols may comprise a predetermined value (e.g., $T_{proc,2}$) defined in the 3GPP specifications. Alternatively, the value of the gap of X symbols may be defined as a UE capability. The UE may be configured to report a value of the gap of X symbols as a UE capability. One possible option is to specify multiple values of X, and the UE may report the value of X it can support.

Alternatively, after determining that the out-of-order uplink scheduling is scheduled (e.g., the second uplink transmission is scheduled earlier than the first uplink transmission), the UE may be configured to process both uplink transmissions (e.g., both PUSCHs) under some scheduling conditions. The UE may be configured to determine whether a scheduling condition is satisfied. The UE may be configured to perform both the first uplink transmission and the second uplink transmission in an event that the scheduling condition is satisfied. The scheduling condition may comprise, for example and without limitation, the transport block (TB) size, number of resource blocks (RBs), number of symbols, use of carrier aggregation, etc. When the scheduling condition is satisfied, it means that the scheduling may be loose and the UE may be able to process both uplink transmissions under such scheduling. The UE may determine whether it can process both uplink transmissions according to the scheduling condition. The scheduling condition may be configured by the network node or determined by the UE.

In some implementations, the scheduling condition may be applied to the first uplink transmission or the second uplink transmission. For example, the UE may drop the transmission of the lower priority PUSCH in an event that the higher priority PUSCH doesn't satisfy the scheduling conditions. Otherwise, the lower priority PUSCH may also be transmitted. In another example, the UE may drop the transmission of the lower priority PUSCH in an event that the lower priority PUSCH doesn't satisfy the scheduling conditions. Otherwise, the lower priority PUSCH may also be transmitted. Processing both PUSCHs under some scheduling conditions may be supported as a UE capability. The UE may be configured to report its support to the network node.

In some implementations, for out-of-order uplink scheduling, in an event that the UE drops the transmission of the first PUSCH (e.g., scheduled by the first DCI), the UE doesn't expect the reception of any other DCI scheduling another PUSCH with the associated resources overlapping in time with the dropped PUSCH resources. The UE may ignore/discard any other DCI scheduling another PUSCH with the associated resources overlapping in time with the dropped PUSCH resources.

Figure 5:
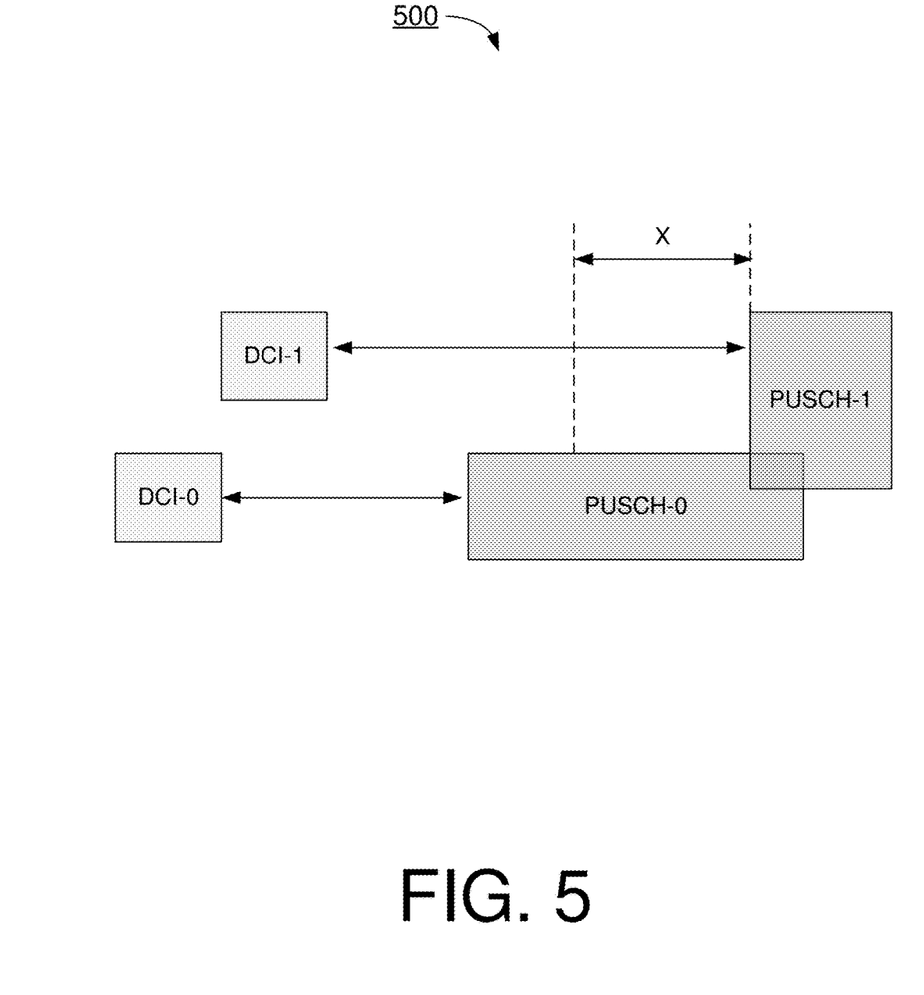
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 500 shows another example of the out-of-order uplink scheduling. The UE may receive a first control signal (e.g., DCI-0) scheduling a first uplink transmission (e.g., PUSCH-0) and a second control signal (e.g., DCI-1) scheduling a second uplink transmission (e.g., PUSCH-1). The first uplink transmission and the second uplink transmission may be overlapped/colliding in time domain. When the first scheduled PUSCH (e.g., PUSCH-0) and the second scheduled PUSCH (e.g., PUSCH-1) are overlapped/colliding in the time domain, the UE may be configured to drop the transmission of the first scheduled PUSCH.

When exactly the UE needs to stop the transmission of the first PUSCH (e.g., PUSCH-0) in an event that it detects the second uplink grant for the high priority PUSCH (e.g., PUSCH-1) may be further discussed. In some embodiments, the UE may stop the transmission at X symbols before the start of the high priority PUSCH (e.g., PUSCH-1). The length of the X symbols may comprise the PUSCH preparation time (e.g., N2). In some embodiments, the UE may continue the transmission of the low priority PUSCH (e.g., PUSCH-0) till the start of the high priority PUSCH (e.g., PUSCH-1). This may be defined as a UE capability. The UE may be configured to report its support to the network node. In some embodiments, the UE may continue the transmission of the low priority PUSCH (e.g., PUSCH-0) till the start of the high priority PUSCH (e.g., PUSCH-1) under some scheduling conditions. The scheduling condition may comprise, for example and without limitation, the TB size, number of RBs, number of symbols, use of carrier aggregation, etc. This may be defined as a UE capability. The UE may be configured to report its support to the network node.

Illustrative Implementations

Figure 6:
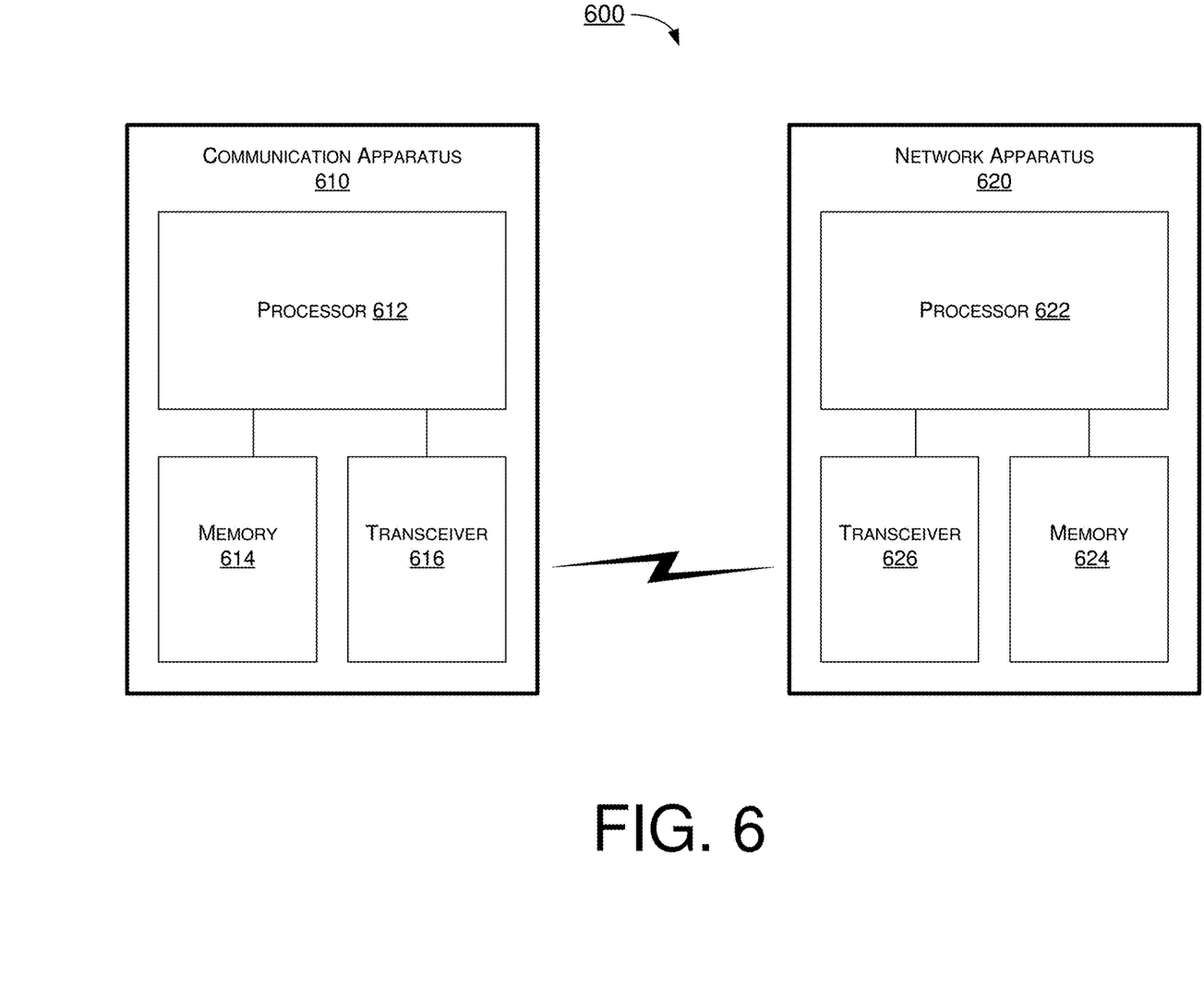
FIG. 6 is a block diagram of an example communication apparatus and an example network apparatus in accordance with an implementation of the present disclosure.
Figure 7:
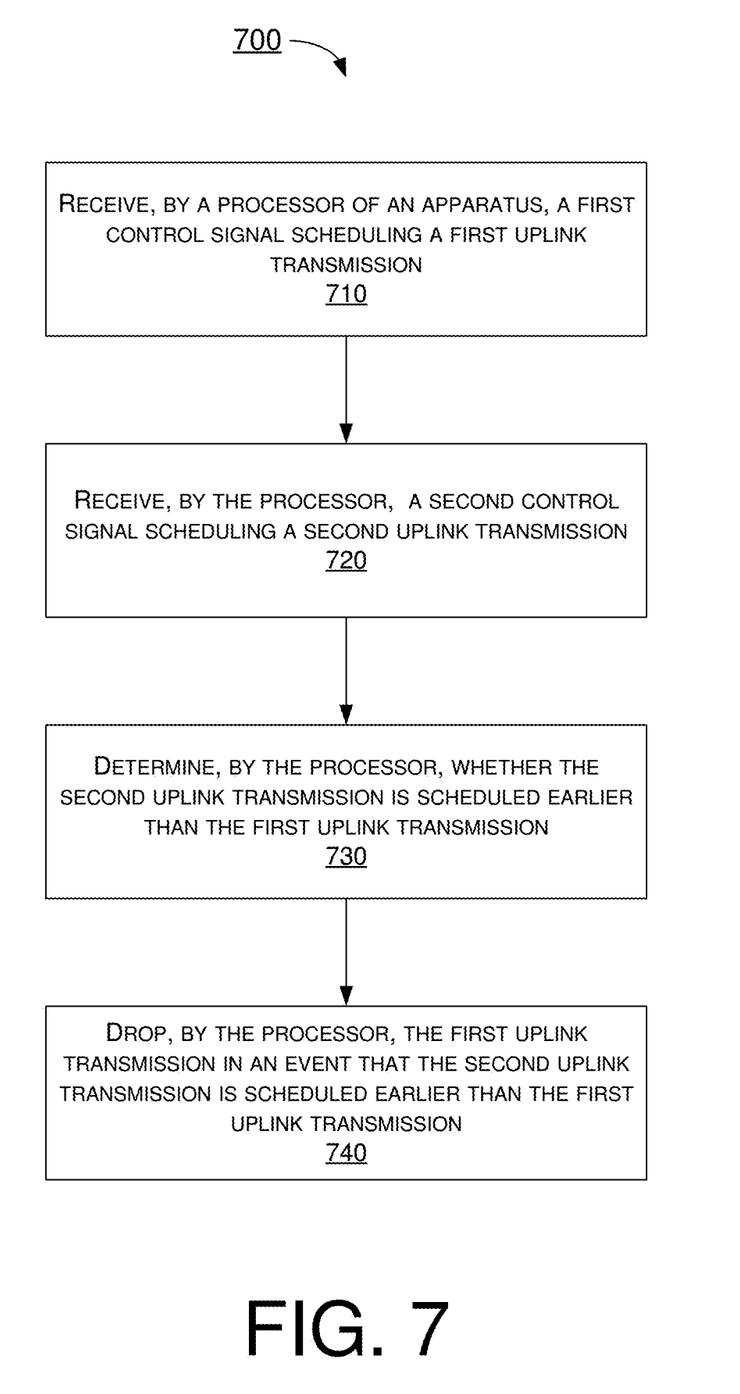
FIG. 7 is a flowchart of an example process in accordance with an implementation of the present disclosure.
Figure 8:
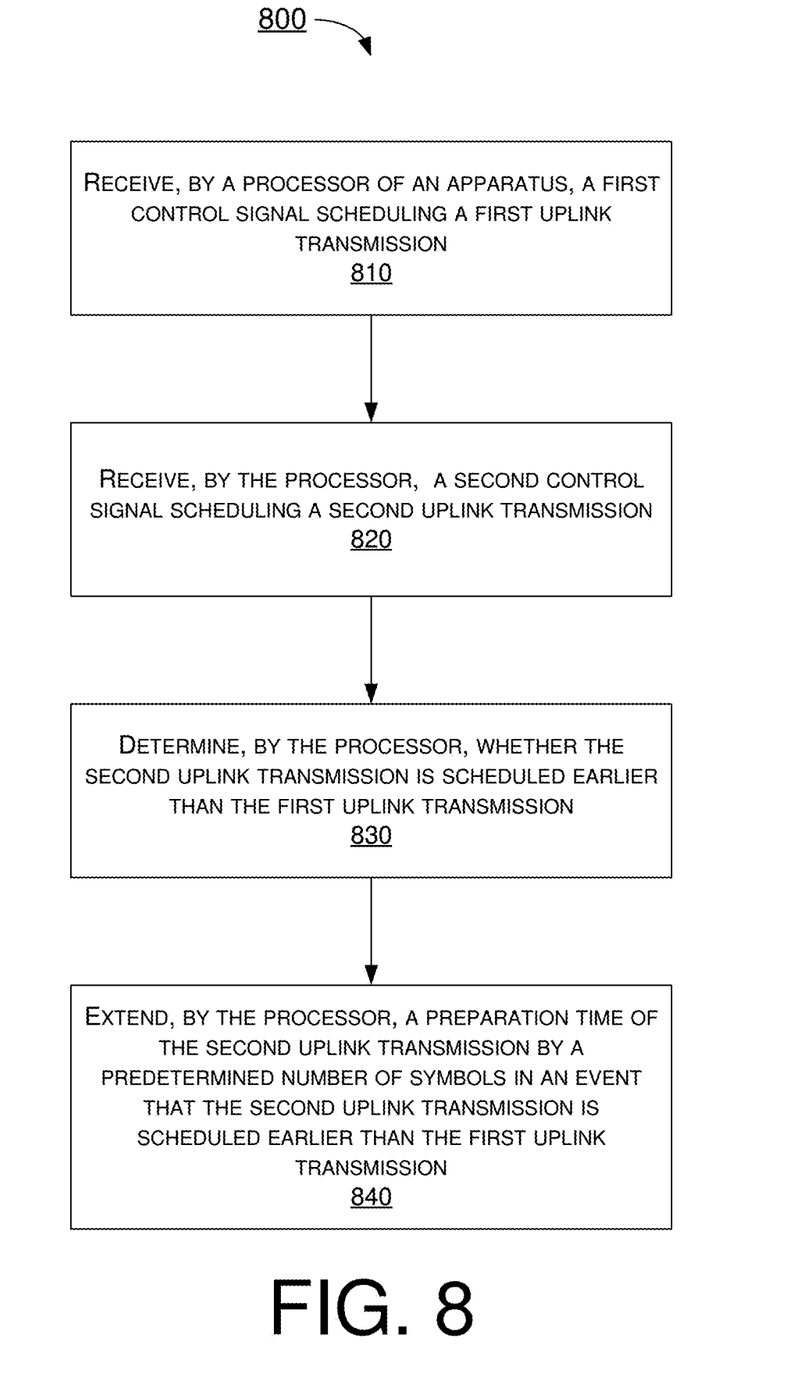
FIG. 8 is a flowchart of an example process in accordance with an implementation of the present disclosure.

FIG. 6 illustrates an example communication apparatus 610 and an example network apparatus 620 in accordance with an implementation of the present disclosure. Each of communication apparatus 210 and network apparatus 220 may perform various functions to implement schemes, techniques, processes and methods described herein pertaining to handling out-of-order uplink scheduling with respect to user equipment and network apparatus in wireless communications, including scenarios/mechanisms described above as well as processes 700 and 800 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 610 may include at least some of those components shown in FIG. 6 such as a processor 612, for example. communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in an LTE, LTE-Advanced or LTE-Advanced Pro network or in a gNB in a 5G, NR, IoT, NB-IoT or IIoT network. Alternatively, network apparatus 620 may be implemented in the form of one or more IC chips such as, for example and without limitation, one or more single-core processors, one or more multi-core processors, or one or more RISC or CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may be configured to receive, via transceiver 616, a first control signal (e.g., DCI or PDCCH) scheduling a first uplink transmission (e.g., PUSCH) from network apparatus 620. Processor 612 may be configured to receive, via transceiver 616, a second control signal (e.g., DCI or PDCCH) scheduling a second uplink transmission (e.g., PUSCH) from network apparatus 620. Processor 612 may receive the first control signal earlier than the second control signal. For the out-of-order uplink scheduling, on an active BWP of a given serving cell, processor 612 may be scheduled with a second PUSCH associated with HARQ process x starting earlier than the ending symbol of the first PUSCH associated with HARQ process y (e.g., x !=y) with a PDCCH that does not end earlier than the ending symbol of first scheduling PDCCH.

Processor 612 may be configured to determine whether the out-of-order uplink scheduling is scheduled (e.g., whether the second uplink transmission is scheduled earlier than the first uplink transmission). Processor 612 may be configured to skip (e.g., not to transmit) at least one uplink transmission (e.g., PUSCH) in an event that the out-of-order uplink scheduling is scheduled. For example, processor 612 may drop the first uplink transmission in an event that the second uplink transmission is scheduled earlier than the first uplink transmission. Specifically, processor 612 may be configured to skip transmitting the PUSCH, with the scheduling PDCCH before the PDCCH that scheduled the later PUSCH, with the first symbol within a predetermined symbols (e.g., X symbols) after the end/last symbol of the later PUSCH that is scheduled to follow out-of-order uplink scheduling.

In some implementations, the value of the predetermined symbols (e.g., X symbols) may comprise the PUSCH preparation time based on one of the capabilities (e.g. capability #1 or capability #2). Alternatively, the support of the predetermined symbols may be defined as a capability. Processor 612 may be configured to report a value of the predetermined symbols as a capability. One possible option is to specify multiple values of X, and processor 612 may report the value of X it can support.

In some implementations, processor 612 may be configured to determine whether the out-of-order uplink scheduling is scheduled by determining whether a last symbol of the first control signal is within a predetermined symbol before a first symbol of the second control signal. Processor 612 may be configured to skip at least one uplink transmission (e.g., PUSCH) in an event that the out-of-order uplink scheduling is scheduled. Specifically, processor 612 may be configured to skip transmitting the PUSCH, with the scheduling PDCCH before the PDCCH that scheduled the later PUSCH, in an event that the last symbol of the scheduling PDCCH is within a predetermined symbols (e.g., Y symbols) before the start/first symbol of the PDCCH scheduling the later PUSCH.

In some implementations, the value of the predetermined symbols (e.g., Y symbols) may comprise the PUSCH preparation time based on one of the capabilities (e.g. capability #1 or capability #2). Alternatively, the support of the predetermined symbols may be defined as a capability. Processor 612 may be configured to report a value of the predetermined symbols as a capability. One possible option is to specify multiple values of Y, and processor 612 may report the value of Y it can support.

In some implementations, after determining that the out-of-order uplink scheduling is scheduled (e.g., the second uplink transmission is scheduled earlier than the first uplink transmission), processor 612 may be configured to extend a preparation time of the second uplink transmission (e.g., later scheduled PUSCH) by a predetermined number of symbols (e.g., E symbols). For example, N2 may be defined as the PUSCH preparation time for the later scheduled PUSCH when there is no out-of-order UL scheduling. For the out-of-order uplink scheduling case, processor 612 may extend the PUSCH preparation time for the later scheduled PUSCH as N2+E symbols. The support of predetermined number of symbols (e.g., E symbols) may be defined as a capability. Processor 612 may be configured to report a value of the predetermined symbols as a capability. One possible option is to specify multiple values of E, and processor 612 may report the value of E it needs to accommodate the out-of-order uplink scheduling.

In some implementations, for the case when processor 612 may skip at least one uplink transmission (e.g., PUSCH) due to the out-of-order uplink scheduling, processor 612 may extend the PUSCH preparation time for the later scheduled PUSCH by E symbols. Processor 612 may be configured to determine whether it can skip at least one PUSCH due to the out-of-order uplink scheduling. Processor 612 may be configured to extend the preparation time of the later scheduled PUSCH by E symbols in an event that processor 612 determines that it can skip at least one PUSCH due to the out-of-order uplink scheduling. For example, N2 may be defined as the PUSCH preparation time for the later scheduled PUSCH when there is no skipping scenario. For the skipping case, processor 612 may extend the PUSCH preparation time for the later scheduled PUSCH as N2+E symbols.

In some implementations, for the out-of-order uplink scheduling, processor 612 may be configured to drop the transmission of the uplink transmissions (e.g., PUSCHs) that their starting symbol (e.g., first symbol) is within a predetermined symbols (e.g., X symbols) after the end (e.g., last symbol) of the prioritized uplink transmission. For any two HARQ process IDs in a given scheduled network node, in an event that processor 612 is scheduled to start a first PUSCH transmission starting in symbol j by a PDCCH ending in symbol i, and in an event that processor 612 is scheduled to transmit a second PUSCH starting earlier than the end of the first PUSCH by a PDCCH that ends later than symbol i, processor 612 may be configured to skip any PUSCH transmission that starts within X symbols after the end of the second PUSCH.

In some implementations, for out-of-order uplink scheduling, there should be a gap of X symbols between the prioritized uplink transmission and the start of any previously scheduled uplink transmission. For any two HARQ process IDs in a given scheduled network node, in an event that processor 612 is scheduled to start a first PUSCH transmission starting in symbol j by a PDCCH ending in symbol i, processor 612 is not expected to be scheduled to transmit a PUSCH ending within X symbols earlier than the start of the first PUSCH by a PDCCH that ends later than symbol i.

In some embodiments, in an event that the gap between the prioritized PUSCH and the start of any previously scheduled PUSCH is smaller than X, processor 612 may consider this as an error case. Processor 612 is not expected to be scheduled with out-of-order uplink scheduling where the gap between the prioritized PUSCH and the start of any previously scheduled PUSCH is smaller than X. Processor 612 may be configured to ignore/discard at least one of the first control signal and the second control signal and not to transmit at least one of the first uplink transmission and the second uplink transmission.

In some embodiments, after determining that the out-of-order uplink scheduling is scheduled (e.g., the second uplink transmission is scheduled earlier than the first uplink transmission), processor 612 may be configured to process both uplink transmissions (e.g., both PUSCHs) under some scheduling conditions. Processor 612 may be configured to determine whether a scheduling condition is satisfied. Processor 612 may be configured to perform both the first uplink transmission and the second uplink transmission in an event that the scheduling condition is satisfied. When the scheduling condition is satisfied, it means that the scheduling may be loose and processor 612 may be able to process both uplink transmissions under such scheduling. Processor 612 may determine whether it can process both uplink transmissions according to the scheduling condition. The scheduling condition may be configured by network apparatus 620 or determined by processor 612.

In some implementations, processor 612 may drop the transmission of the lower priority PUSCH in an event that the higher priority PUSCH doesn't satisfy the scheduling conditions. Otherwise, the lower priority PUSCH may also be transmitted. Alternatively, processor 612 may drop the transmission of the lower priority PUSCH in an event that the lower priority PUSCH doesn't satisfy the scheduling conditions. Otherwise, the lower priority PUSCH may also be transmitted. Processing both PUSCHs under some scheduling conditions may be supported as a capability. Processor 612 may be configured to report its support to network apparatus 620.

In some implementations, for out-of-order uplink scheduling, in an event that processor 612 drops the transmission of the first PUSCH (e.g., scheduled by the first DCI), processor 612 doesn't expect the reception of any other DCI scheduling another PUSCH with the associated resources overlapping in time with the dropped PUSCH resources. Processor 612 may ignore/discard any other DCI scheduling another PUSCH with the associated resources overlapping in time with the dropped PUSCH resources.

In some implementations, when the first scheduled PUSCH and the second scheduled PUSCH are overlapped/colliding in the time domain, processor 612 may be configured to drop the transmission of the first scheduled PUSCH. Processor 612 may stop the transmission at X symbols before the start of the high priority PUSCH. The length of the X symbols may comprise the PUSCH preparation time (e.g., N2).

In some embodiments, processor 612 may continue the transmission of the low priority PUSCH till the start of the high priority PUSCH. This may be defined as a capability. Processor 612 may be configured to report its support to network apparatus 620.

In some embodiments, processor 612 may continue the transmission of the low priority PUSCH till the start of the high priority PUSCH under some scheduling conditions. This may be defined as a capability. Processor 612 may be configured to report its support to network apparatus 620.

Illustrative Processes

FIG. 7 illustrates an example process 700 in accordance with an implementation of the present disclosure. Process 700 may be an example implementation of above scenarios/schemes, whether partially or completely, with respect to handling out-of-order uplink scheduling with the present disclosure. Process 700 may represent an aspect of implementation of features of communication apparatus 610. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of apparatus 610 receiving a first control signal scheduling a first uplink transmission. Process 700 may proceed from 710 to 720.

At 720, process 700 may involve processor 612 receiving a second control signal scheduling a second uplink transmission. Process 700 may proceed from 720 to 730.

At 730, process 700 may involve processor 612 determine whether the second uplink transmission is scheduled earlier than the first uplink transmission. Process 700 may proceed from 730 to 740.

At 740, process 700 may involve processor 612 dropping the first uplink transmission in an event that the second uplink transmission is scheduled earlier than the first uplink transmission.

In some implementations, process 700 may involve processor 612 determining whether a first symbol of the first uplink transmission is within a predetermined symbols after a last symbol of the second uplink transmission.

In some implementations, the predetermined symbols may comprise a PUSCH preparation time.

In some implementations, process 700 may involve processor 612 determining whether a last symbol of the first control signal is within a predetermined symbols before a first symbol of the second control signal.

In some implementations, process 700 may involve processor 612 reporting a value of the predetermined symbols as a UE capability.

In some implementations, process 700 may involve processor 612 ignoring the second control signal in an event that the second uplink transmission is scheduled earlier than the first uplink transmission.

In some implementations, process 700 may involve processor 612 determining whether the first uplink transmission and the second uplink transmission are overlapped in time domain. Process 700 may further involve processor 612 dropping a part of the first uplink transmission in an event that the first uplink transmission and the second uplink transmission are overlapped in time domain.

FIG. 8 illustrates an example process 800 in accordance with an implementation of the present disclosure. Process 800 may be an example implementation of above scenarios/schemes, whether partially or completely, with respect to handling out-of-order uplink scheduling with the present disclosure. Process 800 may represent an aspect of implementation of features of communication apparatus 610. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks of process 800 may executed in the order shown in FIG. 8 or, alternatively, in a different order. Process 800 may be implemented by communication apparatus 610 or any suitable UE or machine type devices. Solely for illustrative purposes and without limitation, process 800 is described below in the context of communication apparatus 610. Process 800 may begin at block 810.

At 810, process 800 may involve processor 612 of apparatus 610 receiving a first control signal scheduling a first uplink transmission. Process 800 may proceed from 810 to 820.

At 820, process 800 may involve processor 612 receiving a second control signal scheduling a second uplink transmission. Process 800 may proceed from 820 to 830.

At 830, process 800 may involve processor 612 determine whether the second uplink transmission is scheduled earlier than the first uplink transmission. Process 800 may proceed from 830 to 840.

At 840, process 800 may involve processor 612 extending a preparation time of the second uplink transmission by a predetermined number of symbols in an event that the second uplink transmission is scheduled earlier than the first uplink transmission.

In some implementations, process 800 may involve processor 612 determining whether a scheduling condition is satisfied. Process 800 may further involve processor 612 performing both the first uplink transmission and the second uplink transmission in an event that the scheduling condition is satisfied.

In some implementations, process 800 may involve processor 612 dropping the first uplink transmission in an event that the scheduling condition is not satisfied.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a first control signal scheduling a first uplink transmission;
receiving, by the processor, a second control signal scheduling a second uplink transmission;
determine, by the processor, whether the second uplink transmission is scheduled earlier than the first uplink transmission; and
dropping, by the processor, the first uplink transmission in an event that the second uplink transmission is scheduled earlier than the first uplink transmission,
wherein the determining comprises:
determining whether a first symbol of the first uplink transmission is within a predetermined symbols after a last symbol of the second uplink transmission; or
determining whether a last symbol of the first control signal is within a predetermined symbols before a first symbol of the second control signal.

2. The method of claim 1, wherein the predetermined symbols comprises a physical uplink shared channel (PUSCH) preparation time.

3. The method of claim 1, further comprising:
reporting, by the processor, a value of the predetermined symbols as a user equipment (UE) capability.

4. The method of claim 1, further comprising:
ignoring, by the processor, the second control signal in an event that the second uplink transmission is scheduled earlier than the first uplink transmission.

5. The method of claim 1, further comprising:
determining, by the processor, whether the first uplink transmission and the second uplink transmission are overlapped in time domain; and
dropping, by the processor, a part of the first uplink transmission in an event that the first uplink transmission and the second uplink transmission are overlapped in time domain.

6. A method, comprising:
receiving, by a processor of an apparatus, a first control signal scheduling a first uplink transmission;

receiving, by the processor, a second control signal scheduling a second uplink transmission;
determine, by the processor, whether the second uplink transmission is scheduled earlier than the first uplink transmission;
extending, by the processor, a preparation time of the second uplink transmission by a predetermined number of symbols in an event that the second uplink transmission is scheduled earlier than the first uplink transmission;
determining, by the processor, whether a scheduling condition is satisfied; and
performing, by the processor, both the first uplink transmission and the second uplink transmission in an event that the scheduling condition is satisfied.

7. The method of claim 6, further comprising:
dropping, by the processor, the first uplink transmission in an event that the scheduling condition is not satisfied.

8. An apparatus, comprising:
a transceiver which, during operation, wirelessly communicates with network nodes of a wireless network; and
a processor communicatively coupled to the transceiver such that, during operation, the processor performs operations comprising:
receiving, via the transceiver, a first control signal scheduling a first uplink transmission;
receiving, via the transceiver, a second control signal scheduling a second uplink transmission;
determine whether the second uplink transmission is scheduled earlier than the first uplink transmission; and
dropping the first uplink transmission in an event that the second uplink transmission is scheduled earlier than the first uplink transmission,
wherein, in determine whether the second uplink transmission is scheduled earlier than the first uplink transmission, the processor either:
determines whether a first symbol of the first uplink transmission is within a predetermined symbols after a last symbol of the second uplink transmission; or
determines whether a last symbol of the first control signal is within a predetermined symbols before a first symbol of the second control signal.

9. The apparatus of claim 8, wherein the predetermined symbols comprises a physical uplink shared channel (PUSCH) preparation time.

10. The apparatus of claim 8, wherein, during operation, the processor further performs operations comprising:
reporting, via the transceiver, a value of the predetermined symbols as a user equipment (UE) capability.

11. The apparatus of claim 8, wherein, during operation, the processor further performs operations comprising:
ignoring the second control signal in an event that the second uplink transmission is scheduled earlier than the first uplink transmission.

12. The apparatus of claim 8, wherein, during operation, the processor further performs operations comprising:
determining whether the first uplink transmission and the second uplink transmission are overlapped in time domain; and
dropping a part of the first uplink transmission in an event that the first uplink transmission and the second uplink transmission are overlapped in time domain.

13. An apparatus, comprising:
a transceiver which, during operation, wirelessly communicates with network nodes of a wireless network; and
a processor communicatively coupled to the transceiver such that, during operation, the processor performs operations comprising:
receiving, via the transceiver, a first control signal scheduling a first uplink transmission;
receiving, via the transceiver, a second control signal scheduling a second uplink transmission;
determine whether the second uplink transmission is scheduled earlier than the first uplink transmission;
extending a preparation time of the second uplink transmission by a predetermined number of symbols in an event that the second uplink transmission is scheduled earlier than the first uplink transmission;
determining whether a scheduling condition is satisfied; and
performing both the first uplink transmission and the second uplink transmission in an event that the scheduling condition is satisfied.

14. The apparatus of claim 13, wherein, during operation, the processor further performs operations comprising:
dropping the first uplink transmission in an event that the scheduling condition is not satisfied.

* * * * *